US011925822B2

(12) United States Patent
Turcotte

(10) Patent No.: US 11,925,822 B2
(45) **Date of Patent: *Mar. 12, 2024**

(54) SAFETY CLIMB ATTENUATION APPARATUS

(71) Applicant: Crown Castle USA, Inc., Canonsburg, PA (US)

(72) Inventor: Allen Gaston Turcotte, Queensbury, NY (US)

(73) Assignee: Crown Castle USA, Inc., Canonsburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,678

(22) Filed: Nov. 21, 2022

(65) Prior Publication Data

US 2023/0226390 A1 Jul. 20, 2023

Related U.S. Application Data

(63) Continuation of application No. 17/189,021, filed on Mar. 1, 2021, now Pat. No. 11,504,558, which is a (Continued)

(51) Int. Cl.

| | |
|---|---|
| ***A62B 35/04*** | (2006.01) |
| ***A62B 35/00*** | (2006.01) |
| ***E04G 21/32*** | (2006.01) |

(52) U.S. Cl.

CPC ............ *A62B 35/04* (2013.01); *A62B 35/005* (2013.01); *A62B 35/0068* (2013.01);

(Continued)

(58) Field of Classification Search

CPC . E04G 21/3261; E04G 21/3295; A62B 35/04; A62B 35/005; A62B 35/0068; E62B 35/0043

See application file for complete search history.

(56) References Cited

U.S. PATENT DOCUMENTS

| | | | |
|---|---|---|---|
| 4,765,754 | A | 8/1988 | Slocum |
| 5,332,071 | A | 7/1994 | Duncan |

(Continued)

FOREIGN PATENT DOCUMENTS

| | | | |
|---|---|---|---|
| AU | 2002223895 | B2 | 6/2002 |
| GB | 2466054 | A | 6/2016 |

(Continued)

OTHER PUBLICATIONS

American National Standard (ANSI), "Safety Requirements for Climbing Ladder Fall Arrest Systems—ANSI/ASSE Z359.16-2016," dated Nov. 2, 2016, 52 pages.

(Continued)

*Primary Examiner* — Tan Le

(74) *Attorney, Agent, or Firm* — Blank Rome LLP

(57) ABSTRACT

A safety climb attenuation apparatus provides a more robust and visually inspectable apparatus for climbing safety. In an upper bracket, a pivot arm is attached to a base that is disposed upon a structure. The upper bracket includes an attenuation member such as an elastic bushing, mounted on the pivot arm or the base, that resists pivoting of the pivot arm relative to the base when a safety cable attached to the pivot arm causes the pivot arm to pivot. In a lower bracket, a similar attenuation member is attached to a base disposed on the structure, with an anchor bolt connecting the cable to the attenuation member so that the attenuation member resists upward movement of the cable.

17 Claims, 7 Drawing Sheets

Related U.S. Application Data continuation of application No. 16/226,442, filed on Dec. 19, 2018, now Pat. No. 10,940,340.

(60) Provisional application No. 62/611,191, filed on Dec. 28, 2017.

(52) U.S. Cl.
CPC ...... *A62B 35/0043* (2013.01); *E04G 21/3261* (2013.01); *E04G 21/3295* (2013.01)

(56) References Cited

U.S. PATENT DOCUMENTS

| | | | | |
|---|---|---|---|---|
| 6,161,647 | A | 12/2000 | Braden | |
| 10,940,340 | B2 | 3/2021 | Turcotte | |
| 11,504,558 | B2 * | 11/2022 | Turcotte | A62B 35/0068 |
| 2005/0029045 | A1 | 2/2005 | Cowin | |
| 2010/0012424 | A1 | 1/2010 | Krauss | |
| 2014/0001334 | A1 | 1/2014 | Hirst | |
| 2015/0129357 | A1 | 5/2015 | Roth | |
| 2016/0281426 | A1 | 9/2016 | Short | |
| 2017/0260762 | A1 | 9/2017 | Ostrobrod | |
| 2018/0100318 | A1 | 4/2018 | Branagan et al. | |

FOREIGN PATENT DOCUMENTS

| | | | |
|---|---|---|---|
| JP | 200107305 | A1 | 4/2000 |
| JP | 2000107306 | A | 4/2000 |
| JP | 3769391 | B2 * | 4/2006 |
| WO | 9801639 | A1 | 1/1998 |
| WO | 2005044384 | A1 | 5/2005 |

OTHER PUBLICATIONS

Int'l Search Report & Written Opinion received in copending PCT Application No. PCT/US2018/066591, dated Apr. 4, 2019, 20 pages.

Office Action in counterpart Canadian Appl. No. 202001751 dated Aug. 6, 2021, 3-pgs.

Search report in counterpart Chilean Appl. No. 202001751, dated Feb. 21, 2022, 21-pgs.

Examination Report in counterpart Saudi Arabian Appl. No. 520412352, dated Mar. 8, 2022, 15-pgs.

Office Action in counterpart Ukrainian Appl. No. a202004739, dated Oct. 11, 2021, 8-pgs.

Examination Report in counterpart Costa Rican Appl. No. 2020-328, dated Feb. 13, 2023, 6 pgs.

* cited by examiner

SAFETY CLIMB ATTENUATION APPARATUS

CROSS-REFERENCE TO RELATED APPLICATIONS

This is a continuation of U.S. patent application Ser. No. 17/189,021, filed on Mar. 1, 2021, which is a continuation of U.S. patent application Ser. No. 16/226,442, filed on Dec. 19, 2018 (now U.S. Pat. No. 10,940,340) which claims the benefit of U.S. Provisional App. No. 62/611,191, filed on Dec. 28, 2017, the subject matter of each of which is incorporated herein by reference in its entirety.

TECHNICAL FIELD

The present invention relates to the field of safety climbs, and in particular to a safety climb for use on structures such as communication towers.

BACKGROUND ART

Safety climbs are conventionally used with communication towers and other structures to provide resilience to safety lines when they are used to prevent a worker from falling. A conventional safety climb fixture is illustrated in FIG. 1. Such fixtures include an upper closed housing with an internal spring or elastic bushing engaged with a vertically moveable rod having a ring at a bottom end thereof. As illustrated in FIG. 1, a safety cable is supported by the ring, and conventional safety equipment may be secured to the safety cable.

Although safety climb fixtures as illustrated in FIG. 1 can provide effective attenuation in case of a fall, they suffer from several problems. For example, the attenuation spring is hidden inside the closed housing, requiring an inspector to physically use a crane or climb a tower or other structure in order to open the housing and visually inspect the attenuation spring to determine whether the fixture is in working order. Another problem associated with safety climb fixtures as illustrated in FIG. 1 is the close proximity of the safety rod and attached safety cable to the tower and/or equipment mounted on the tower. In such arrangements, the close proximity of the safety cable to the tower or equipment can damage the tower and/or equipment, and viewing of the safety climb fixture from the ground is often blocked or obstructed by the tower and/or equipment mounted thereon. A further problem associated with safety climb fixtures as illustrated in FIG. 1 is that they tend to degrade or fail after extended periods of time due to water retention or missing caps to protect the internal components thus requiring frequent inspections during their lifespans, and requiring more frequent repairs or replacements. In addition, certain types of conventional safety climb fixtures having coil springs are susceptible to incorrect installation and corrosion.

SUMMARY OF INVENTION

In one aspect, a safety climb attenuation apparatus comprises a safety climb attenuation bracket, comprising: a base member, configured for mounting to a structure; a pivot arm member, pivotably disposed on the base member; and an attenuation member, disposed on one or both of the pivot arm member and the base member, wherein the attenuation member resists pivoting of the pivot arm member relative to the base member.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are illustrated in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to “one embodiment” or to “an embodiment” means that a particular feature, structure, or characteristic described in connection with the embodiments is included in at least one embodiment of the invention, and multiple references to “one embodiment” or “an embodiment” should not be understood as necessarily all referring to the same embodiment.

The terms “a,” “an,” and “the” are not intended to refer to a singular entity unless explicitly so defined, but include the general class of which a specific example may be used for illustration. The use of the terms “a” or “an” may therefore mean any number that is at least one, including “one,” “one or more,” “at least one,” and “one or more than one.”

The term “or” means any of the alternatives and any combination of the alternatives, including all of the alternatives, unless the alternatives are explicitly indicated as mutually exclusive.

The phrase “at least one of” when combined with a list of items, means a single item from the list or any combination of items in the list. The phrase does not require all of the listed items unless explicitly so defined.

Any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this description, the term "connect" or "connected" means either an indirect or direct connection. Thus, if a first device is connected to a second device, that connection may be through a direct connection or through an indirect connection via other devices and connections.

Safety climb attenuation brackets and apparatuses are described below that address the above-noted problems of conventional safety climb fixtures.

An embodiment of a safety climb attenuation bracket is illustrated in FIGS. 2-5.

Figure 6:
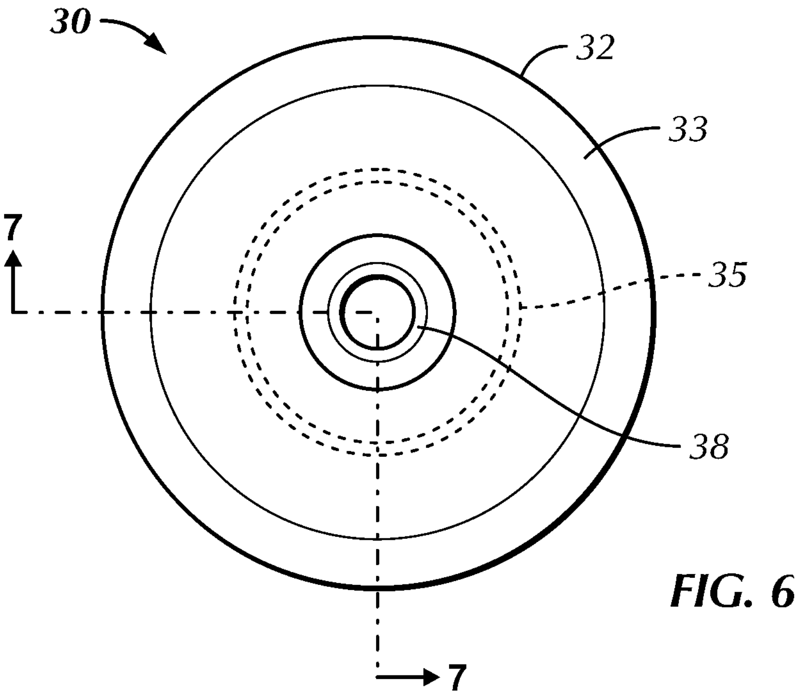
FIG. 6 is a top view of an elastic compression bushing for use in a safety climb attenuation bracket according to one embodiment.
Figure 7:
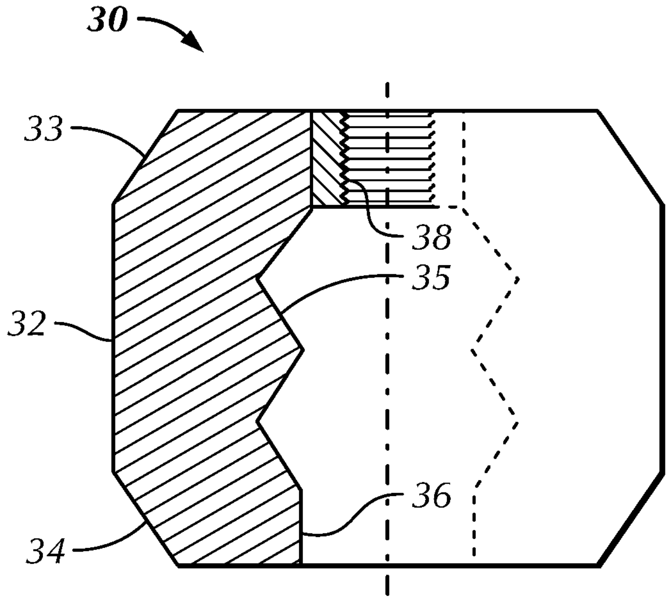
FIG. 7 is a cutaway of an elastic compression bushing for use in a safety climb attenuation bracket according to one embodiment.

FIGS. 6 and 7 illustrate details of an elastic compression bushing for use in an attenuation bracket according to one embodiment.

Figure 8A:
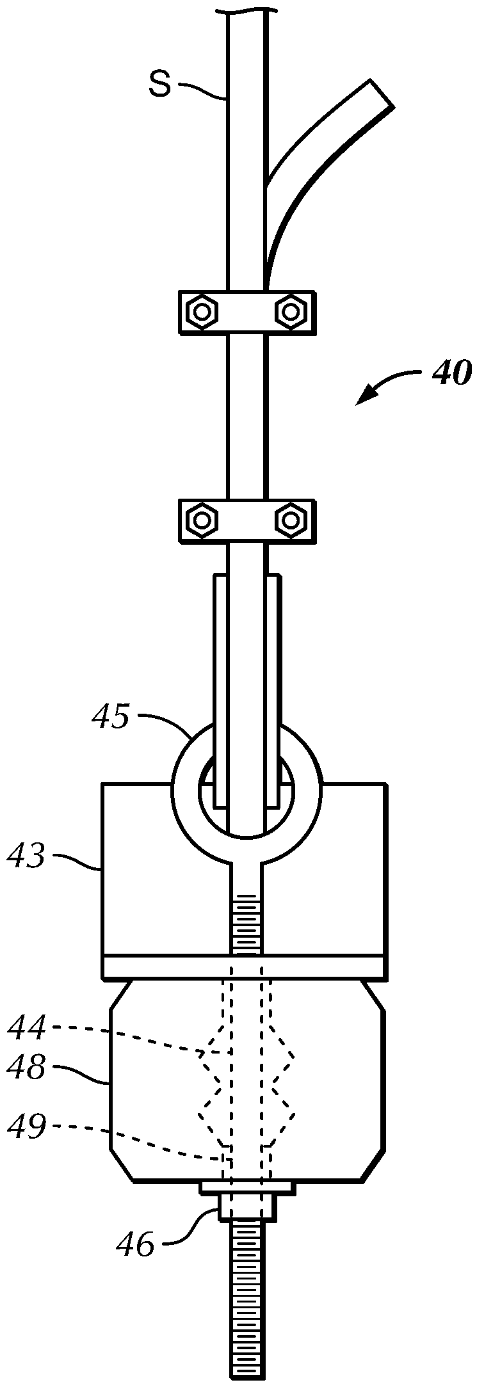
FIG. 8A is a front view and FIG. 8B is a side view of a lower safety cable anchoring system according to one embodiment.
Figure 8B:
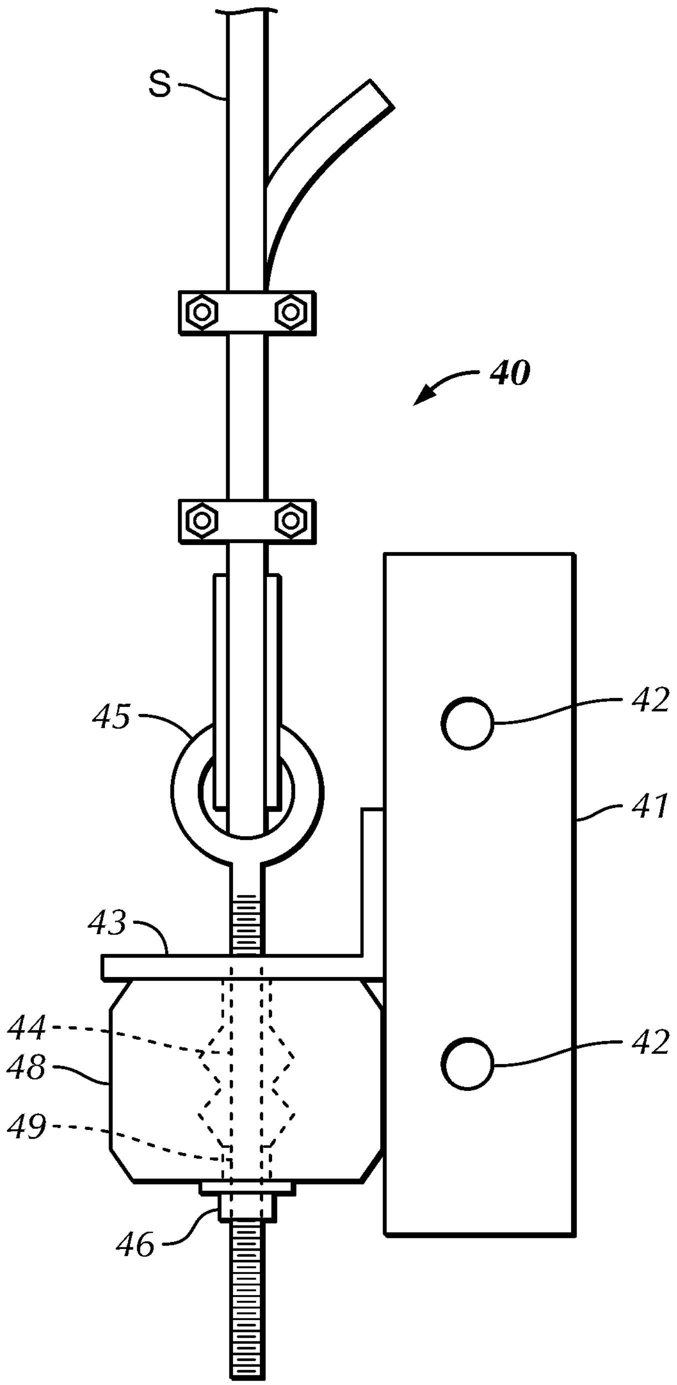

FIGS. 8A-8B include front and side views of a lower safety cable anchoring apparatus in accordance with one embodiment.

Figure 1:
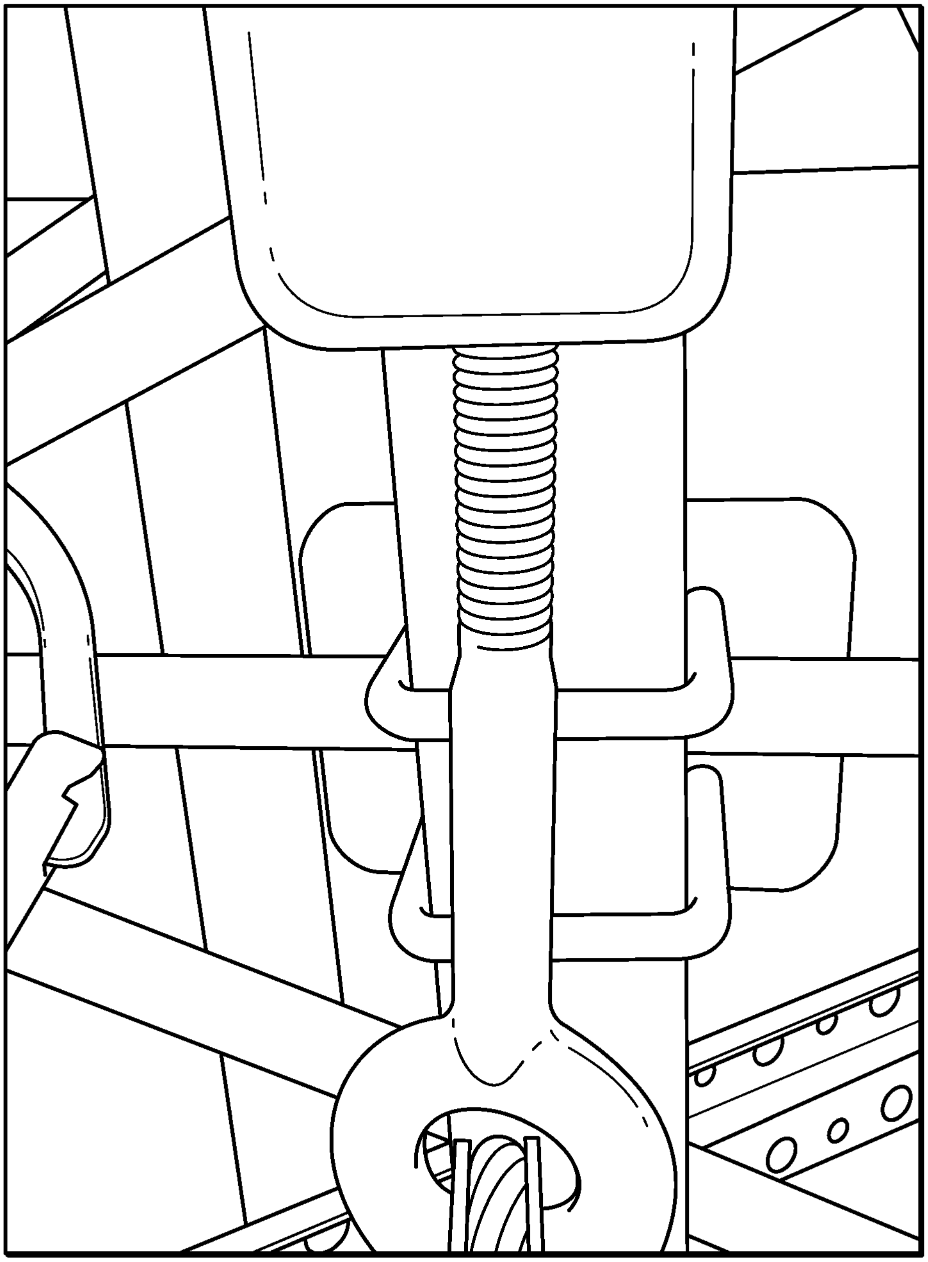
FIG. 1 (Prior Art)
FIG. 1 is prior art example of a safety climb attenuation bracket.
Figure 2:
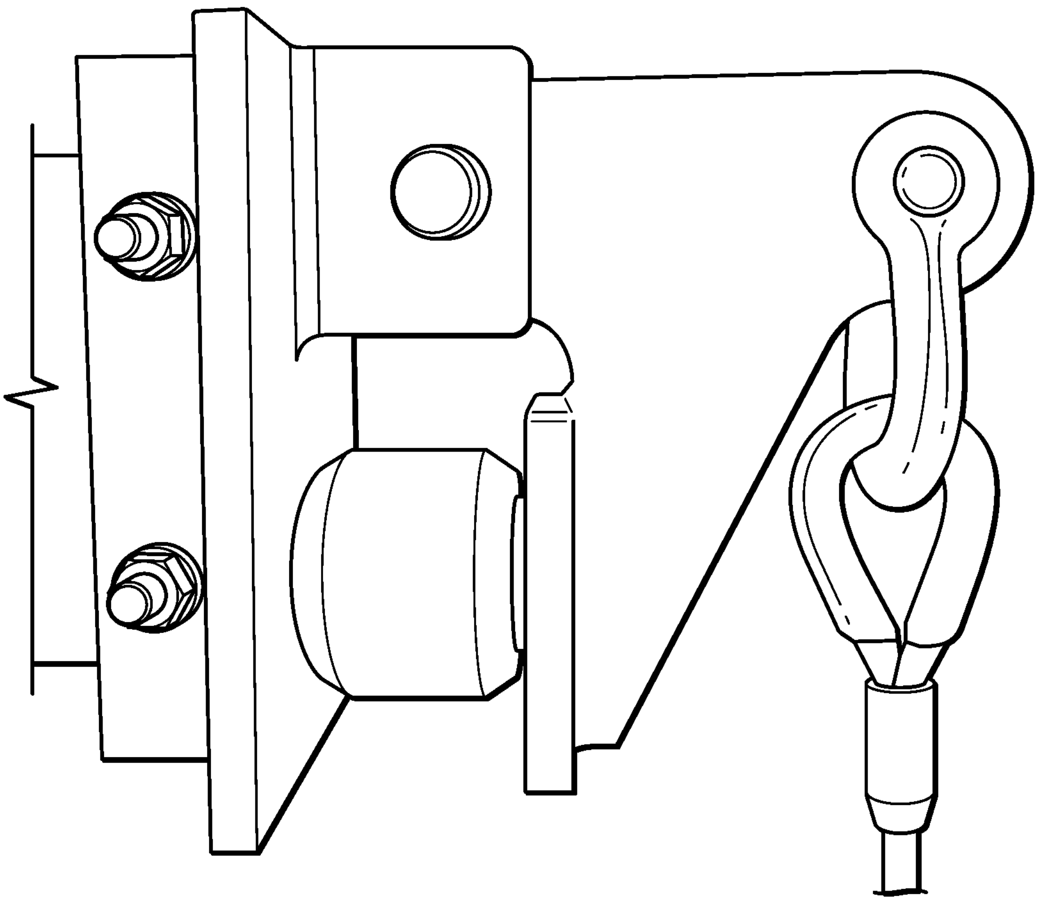
FIG. 2 is a side view of a safety climb attenuation bracket according to one embodiment, connected to a safety cable.
Figure 3:
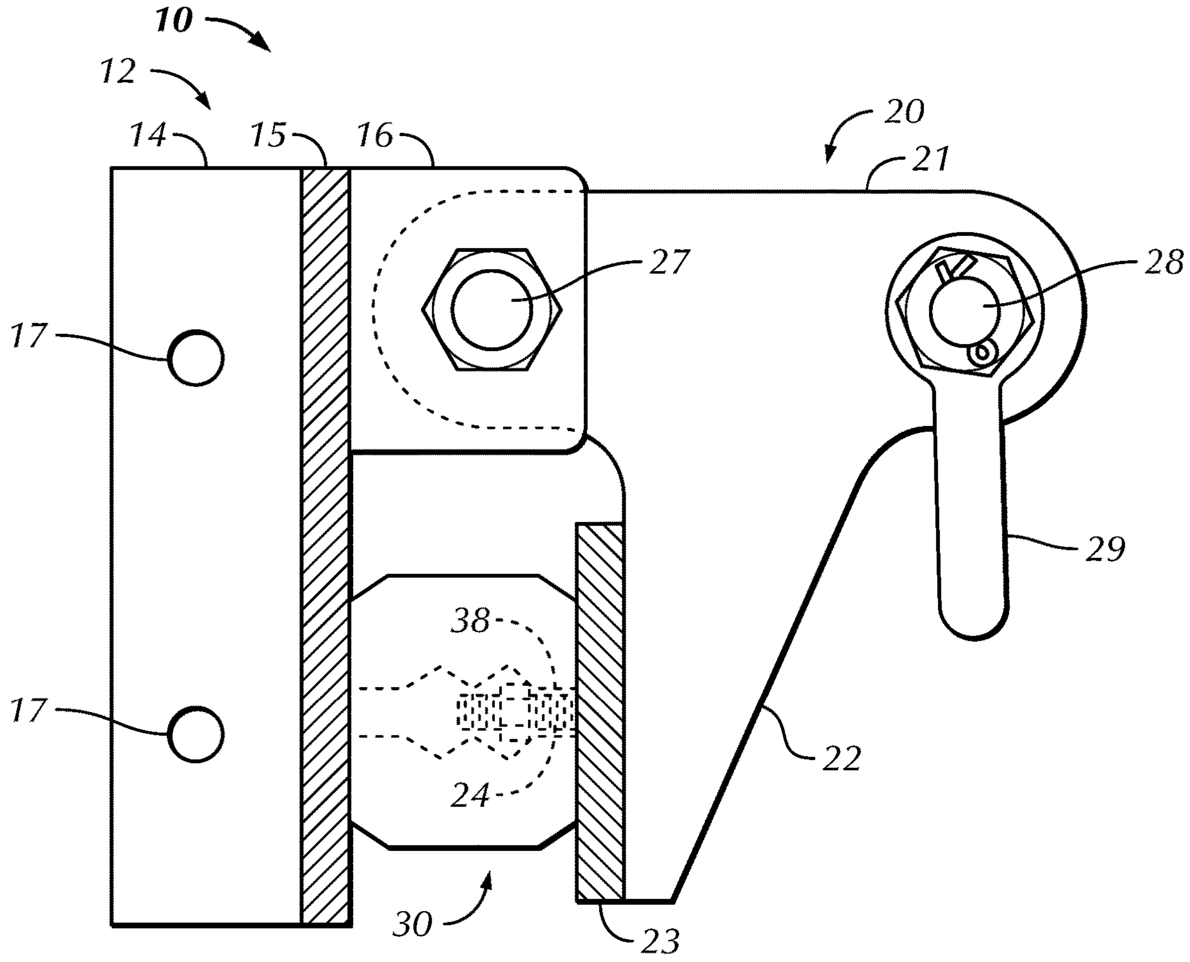
FIG. 3 is another side view of the safety climb attenuation bracket according to one embodiment.
Figure 4A:
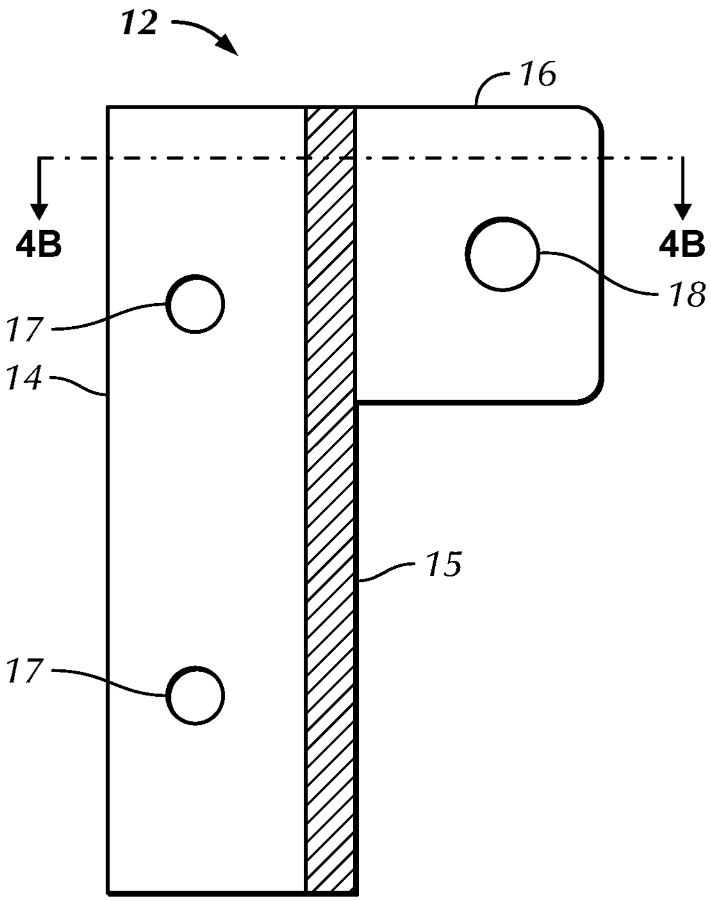
FIG. 4A is a side view and FIG. 4B is a top view of a base of the safety climb attenuation bracket according to one embodiment.
Figure 4B:
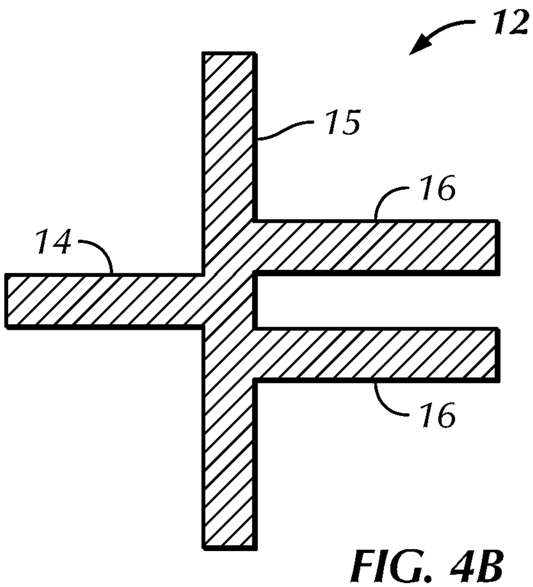
Figure 5:
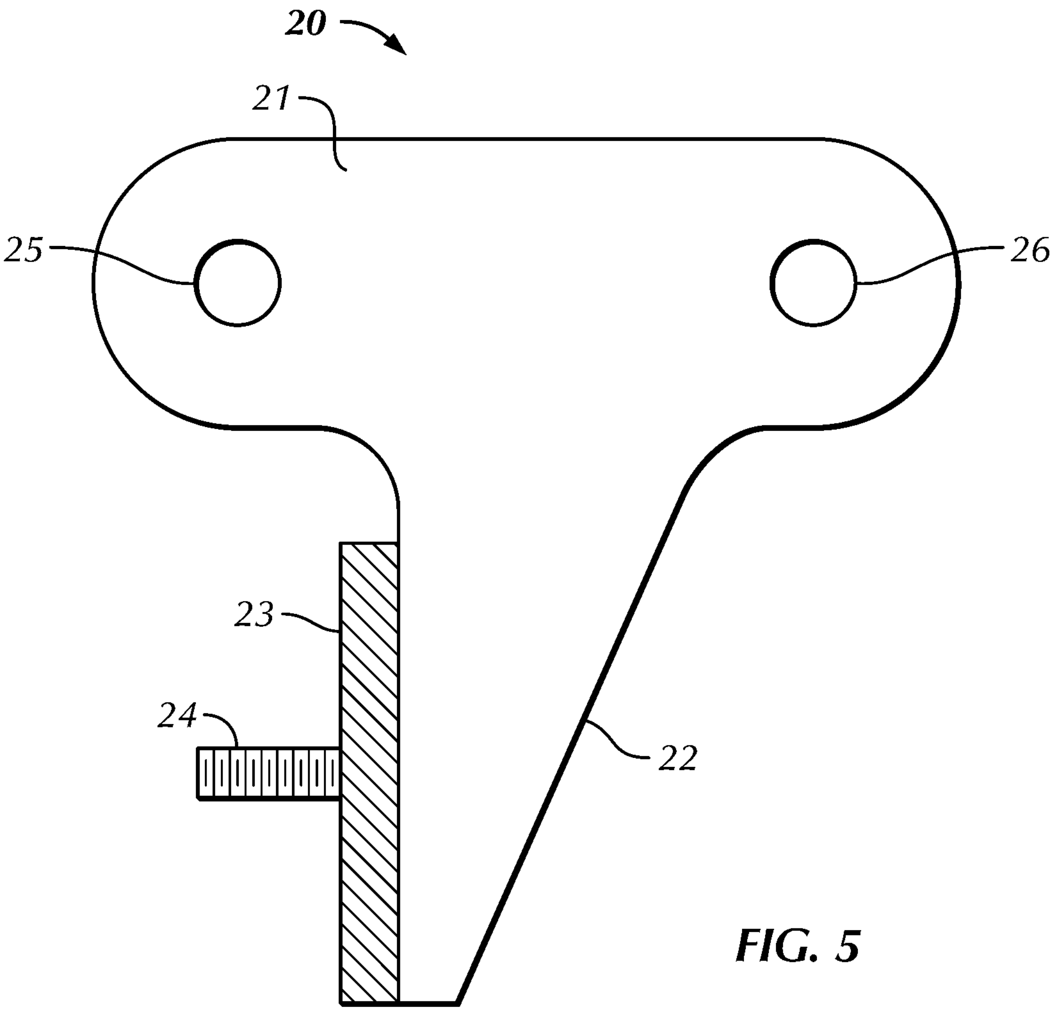
FIG. 5 is a side view of a pivot arm of the safety climb attenuation bracket according to one embodiment.

Side views of safety climb attenuation apparatuses in accordance with various embodiments are illustrated in FIGS. 2 and 3. The safety climb attenuation bracket 10 includes a base member 12, pivot arm 20, and an attenuation member, in one embodiment in the form of an elastic attenuation bushing 30. Side and top views of the base member 12 according to one embodiment are illustrated in FIGS. 4A-4B and FIG. 5. A side view of the pivot arm 20 is illustrated in FIG. 5. An end view and a partial side sectional view of the elastic attenuation bushing 30 are illustrated in FIGS. 6 and 7, respectively.

As illustrated in FIG. 3, the pivot arm 20 is pivotally mounted on the base member 12, and the elastic attenuation bushing 30 is secured to the pivot arm 20. In one embodiment, the base member 12 includes a mounting bracket 14, a back plate 15, a pair of support tabs 16, mounting holes 17, and a pivot hole 18 through the support tabs 16, as illustrated in FIGS. 3 and 4A-4B. The mounting bracket 14 uses the mounting holes 17 for attaching the mounting bracket 14 of the base member 12 to a structure (not shown in FIG. 3). In other embodiments, the mounting bracket 14 may be omitted, and the back plate 15 may be configured for mounting the base member 12 to the structure. In some embodiments, a single support tab 16 may be used instead of a pair of support tabs 16.

As illustrated in FIGS. 3 and 5, the pivot arm 20 includes a horizontal arm extension 21 and a vertical arm extension 22 that extends downward from the horizontal arm extension 21. Although illustrated in FIGS. 3 and 5 as extending perpendicular to the horizontal arm extension 21, the vertical arm extension 22 may be formed at other angles than perpendicular. The details of the shape of the pivot arm 20, as well as the placement of the vertical arm extension 22 relative to the horizontal arm extension 21 are illustrative and by way of example only, and other shapes and arrangements may be used. A back plate 23 may be connected to the vertical arm extension 22, and a threaded stud 24 extends from the back plate 23 in one embodiment. In some embodiments, the stud 24 is welded to the back plate 23, while in other embodiments, other means for attaching the stud 24 may be used, such as inserting the stud 24 through a hole formed in the back plate 23. Other techniques for attaching the elastic attenuation bushing 30 may be used as desired, such as glue, a strap, etc. In some embodiments, the back plate 23 may be formed integral with the vertical arm extension 22 In some embodiments, the elastic attenuation bushing 30 may be mounted on the back plate 15 instead of on the back plate 23, so that the elastic attenuation bushing 30 may be mounted on the base member 12 instead of the pivot arm 20, and if a stud 24 is used, the stud 24 may be disposed on the base member 12 with the attenuation bushing 30. A pivot hole 25 is provided at one end of the horizontal arm extension 21, and a safety cable-mounting hole 26 is provided at another end of the horizontal arm extension 21. As illustrated in FIG. 3, a pivot bolt 27 is used to pivotally mount the pivot arm 20 on the support tabs 16 of the base member 12. The pivot bolt 27 extends through the pivot holes 18 of the support tabs 16 of the base member 12, and extends through the pivot hole 25 of the pivot arm 20. As further illustrated in FIG. 3, a shackle 29 is secured to the horizontal arm extension 21 of the pivot arm 20 through the cable-mounting hole 26 (illustrated in FIG. 5). A mounting bolt 28 extends through the cable-mounting hole 26 to secure the shackle 29 to the pivot arm 20.

As illustrated in FIGS. 6 and 7, the elastic attenuation bushing 30 includes a generally cylindrical body 32. In some embodiments, one or both ends of the cylindrical body may be tapered, as illustrated in FIG. 7 with an upper taper 33 and a lower taper 34. Such attenuation bushings may be adapted for use in disclosed embodiments from commercially available sources, such as hollow rubber springs sold by Timbren Industries under the designation Aeon. A central contoured hole 35 extends through the center of the cylindrical body 32. A central opening 36 is provided at one end of the elastic attenuation bushing 30, and a threaded hole 38 is provided centrally in the other end of the bushing 30. The bushing 30 is elastically compressible along its central longitudinal axis in order to provide controlled deflection when a load is applied to the horizontal arm extension 21 through the shackle 29 of a safety cable (not shown). The elastic attenuation bushing 30 may be made of any suitable materials, dimensions and shapes in order to achieve the desired deflection characteristics. For example, cylindrical rubber bump stops conventionally used on truck suspensions may be adapted for use as the elastic attenuation bushing 30 of one embodiment. Although as illustrated the attenuation member is an elastic attenuation bushing 30, in other embodiments controlled deflection may be provided by an attenuation member that comprises a compression spring, hydraulic cylinder, or any other suitable means known to those skilled in the art. In some embodiments, the attenuation member may be formed in a way that pivoting of the pivot arm 20 causes the attenuation member to resist expansion, such as an expansion spring connected between the pivot arm 20 and the base member 12.

The safety climb attenuation bracket apparatus 10 operates as follows. During a safety incident such as a worker fall, a sudden downward load applied through the safety cable shackle 29 to the right side of the horizontal arm extension 21 illustrated in FIGS. 3 and 5 causes the pivot arm 20 to pivot around the pivot hole 25 within the support tabs 16 of the base member 12. Clockwise rotation of the pivot arm 20 around the pivot bolt 27 causes the back plate 23 and elastic attenuation bushing 30 to move toward the back plate 15 of the base member 12. The elastic qualities of the attenuation bushing 30 are such that a desired amount of deflection is achieved based upon the load applied to the bushing 30.

As understood by those skilled in the art, the size, shape, material and deflection curve of the attenuation bushing 30 may be varied in order to control its deflection characteristics. In certain embodiments, for a load applied during typical fall situations, the elastic attenuation bushing deflection may typically range from 0.5 to 5 inches, for example, from 0.1 to 2 inches, or from 0.2 to 1.5 inches. During a fall situation in which safety equipment is used to apply a load to the safety cable, a typical load applied to the elastic attenuation bushing 30 may range from 1,000 to 10,000 pounds, for example, from 2,000 to 7,000 pounds, or from 2,500 to 5,500 or 6,000 pounds.

As understood by those skilled in the art, the dimensions of the pivot arm 20 may be selected in order to provide the desired deflection and attenuation characteristics. For example, the distance along the horizontal arm extension 21 between the pivot hole 25 and cable-mounting hole 26 may be selected in combination with the horizontal distance between the pivot hole 25 and the threaded stud 24 upon which the elastic attenuation bushing 30 is mounted. For example, the ratio of the distance between the pivot hole 25 and cable-mounting hole 26 along the horizontal arm extension 21 to the distance between the pivot hole 25 and the threaded stud 24 may typically range from 0.2:1 to 5:1, for example, from 0.3:1 to 3:1, or from 0.5:1 to 2:1, or from 0.75:1 to 1.5:1, or from 0.8:1 to 1.2:1. In certain embodiments, the ratio may be about 1:1. The specific distances may be selected as desired, and may typically range from 2 to 20 inches, or from 3 to 10 inches, or from 4 to 8 inches.

FIGS. 8A-8B illustrate a lower cable anchoring apparatus 40 including attenuation member such as an elastic attenuation bushing 48, which may be of the same or similar design to the elastic attenuation bushing 30 illustrated in FIGS. 6 and 7. The cable anchoring apparatus 40 includes an anchor base 41 that may be mounted at or near the bottom or base of a communication tower or other structure (not shown in FIGS. 8A-8B). In the embodiment illustrated, two anchor-mounting holes 42 are provided for attachment of the anchor base 41 at or near the base of the tower. An anchor bracket 43 extends from the anchor base 41. A threaded anchor bolt 44 includes an upper attachment ring 45 for attachment of a safety cable and shackle S. The anchor bolt 44 is threaded into a threaded hole 49 of the elastic attenuation bushing 48, and may be secured thereto by a nut and washer 46. The lower cable anchoring apparatus 40 may be used to relieve tension placed on the cable S due to the "sunflower effect" in which thermal expansion of a tower on one side causes the structure to bend or curve slightly.

The elastic attenuation bushing 48 illustrated in FIGS. 8A-8B may be selected in order to provide the same or similar deflection distances as described above for the elastic attenuation bushing 30 of FIGS. 6 and 7. Typically, the elastic attenuation bushing 48 may be subjected to a cable tension of from 3 to 400 pounds, and its deflection or elastic characteristics may be selected accordingly. As with the upper safety attenuation bracket, other embodiments may use an attenuation member other than an elastic attenuation bushing, or may use an attenuation member that resists expansion instead of resisting compression.

The various components of the present safety climb apparatus may be made from any suitable materials known to those skilled in the art. For example, the bracket components may be made from metal such as plate steel that is cut into different shaped pieces and then welded together, mechanically fastened, etc. In certain embodiments, the bracket components may be hot dipped galvanized steel. An assortment of nuts, bolts, pins and locking devices known to those skilled in the art may be used in the assemblies. In certain embodiments, the upper elastic attenuation bushing and the lower elastic bushing may be a rubberized product such as a bump stop used on a truck suspension. The wire rope may be a 7×19 stainless steel cable with a thimble and swaged connection secured to the top assembly using a shackle.

The present safety climb and attenuation system has many advantages over conventional safety climb apparatuses. The attenuation member is removed from the cable load path and placed in another location on the assembly, which provides more dependability and reusablity. The attenuation member and bracket are more robust than other products available on the market, requiring less maintenance and associated costs. The system also allows the user to visually inspect the components from the ground prior to use.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An apparatus for safety of a worker on a structure, the apparatus comprising:
- a cable having first and second ends;
- a first base configured to mount to the structure and having a pivot point and a first surface;
- a one-piece pivot arm connected to the pivot point and being pivotable thereabout, the pivot arm having a first attachment point and a second surface, the first attachment point configured to support the first end of the safety cable, the second surface being movable with the pivot of the pivot arm relative to the first surface; and
- a first attenuator disposed between the first and second surfaces and configured to resist the movement of the second surface toward the first surface,
- wherein the first attenuator is an elastic bushing configured to resist compression between the first and second surface.

2. The apparatus of claim 1, wherein the second surface of the pivot arm comprises a stud extending therefrom, and the elastic bushing being disposed on the stud.

3. The apparatus of claim 1, further comprising a shackle secured to the first attachment point of the pivot arm and configured to attach to the first end of the cable.

4. The apparatus of claim 1, further comprising an anchor configured to mount to the structure and having a second attachment point, the second attachment point configured to support the second end of the cable.

5. The apparatus of claim 4, wherein the anchor comprises:
- a second base configured to mount to the structure and having a third surface with an opening therethrough;
- a stud movably disposed in the opening of the third surface, one end of the stud having the second attachment point, another end of the stud having a fourth surface, the fourth surface being movable with the stud relative to the third surface; and
- a second attenuator disposed on the stud between the third and fourth surface, the second attenuator configured to resist the movement of the fourth surface toward the third surface.

6. The apparatus of claim 5, wherein the first and second attenuators are both visible while the apparatus is mounted to the structure.

7. The apparatus of claim 5, wherein the second attenuator is a second elastic bushing disposed between the third and fourth surfaces, the second elastic bushing being configured to resist compression between the third and fourth ends in response to the movement of the fourth surface toward the third surface.

8. The apparatus of claim 1, wherein the elastic bushing of the first attenuator has a generally cylindrical body and at least one end of the cylindrical body is tapered.

9. The apparatus of claim 1, wherein the elastic bushing of the first attenuator is a hollow rubber spring.

10. The apparatus of claim 1, wherein the elastic bushing of the first attenuator includes a central contoured hole.

11. The apparatus of claim 1, wherein the elastic bushing includes an opening at one end of the central contoured hole and a threaded hole at the other end of the central contoured hole.

12. An apparatus for safety of a worker on a structure, the apparatus comprising:

a cable having first and second ends;

a base configured to mount to the structure and having a first surface;

a one-piece movable arm connected to the base, the movable arm having an attachment point and a second surface, the attachment point being configured to support the first end of the safety cable, the second surface being movable with the movement of the movable arm relative to the first surface; and an attenuator disposed between the first and second surfaces and configured to resist the movement of the second surface toward the first surface, wherein the attenuator is an elastic bushing configured to resist compression between the first and second surfaces.

13. The apparatus of claim 12, further comprising a shackle coupled to the first attachment point of the movable arm, and the shackle being configured to attach to the first end of the cable.

14. The apparatus of claim 13, further comprising an anchor configured to mount to the structure, the anchor being configured to support the second end of the cable.

15. The apparatus of claim 14, wherein the anchor includes a second attenuator, the second attenuator is an elastic bushing configured to resist compression against a third surface in response to tension on the cable caused by upward movement of the cable or thermal expansion of the structure.

16. The apparatus of claim 12, wherein the elastic bushing is coupled to the movable arm.

17. The apparatus of claim 16, wherein the elastic bushing is a hollow rubber spring.

* * * * *